United States Patent
Greenspan et al.

(10) Patent No.: US 6,516,191 B1
(45) Date of Patent: Feb. 4, 2003

(54) HYPERMEDIA LINKS THAT ADDRESS TRAFFIC CHANNELS IN A WIRELESS COMMUNICATION SYSTEM

(75) Inventors: Steven L. Greenspan, Scotch Plains, NJ (US); Anders Fernstedt, Davenport, CA (US); Jocelyn Cloutier, Menlo Park, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/448,445

(22) Filed: Nov. 24, 1999

(51) Int. Cl.[7] .............................................. H04M 11/00
(52) U.S. Cl. ...................... 455/412; 455/419; 455/450; 455/466
(58) Field of Search .................................. 455/450, 509, 455/418, 419, 445, 412, 452

(56) References Cited

U.S. PATENT DOCUMENTS

| | | |
|---|---|---|
| 5,752,186 A | 5/1998 | Malackowski et al. |
| 5,805,442 A | 9/1998 | Crater et al. |
| 5,867,780 A | 2/1999 | Malackowski et al. |
| 5,881,060 A | 3/1999 | Morrow et al. |
| 5,956,487 A | 9/1999 | Venkatraman et al. |
| 5,980,090 A | 11/1999 | Royal, Jr. et al. |
| 6,055,633 A | 4/2000 | Schrier et al. |
| 6,061,603 A | 5/2000 | Papadopoulos et al. |
| 6,139,177 A | 10/2000 | Venkatraman et al. |
| 6,151,625 A | 11/2000 | Swales et al. |
| 6,176,421 B1 | 1/2001 | Royal, Jr. et al. |
| 6,201,996 B1 | 3/2001 | Crater et al. |
| 6,218,930 B1 | 4/2001 | Katzenberg et al. |
| 6,252,868 B1 * | 6/2001 | Diachina et al. ............ 370/347 |
| 6,356,761 B1 * | 3/2002 | Huttunen et al. ........... 455/456 |

* cited by examiner

Primary Examiner—Lee Nguyen

(57) ABSTRACT

A hypertext protocol for Internet browsing applications includes hyperlinks that address traffic channels in a wireless system. Broadcast information content may be transmitted by the wireless system in one or more broadcast traffic channels. Multiple mobile stations may receive the broadcast information content simultaneously. Because the mobile stations share the broadcast traffic channels, a high throughput is achieved with proportionately less bandwidth being broadcast into a cell site.

13 Claims, 2 Drawing Sheets

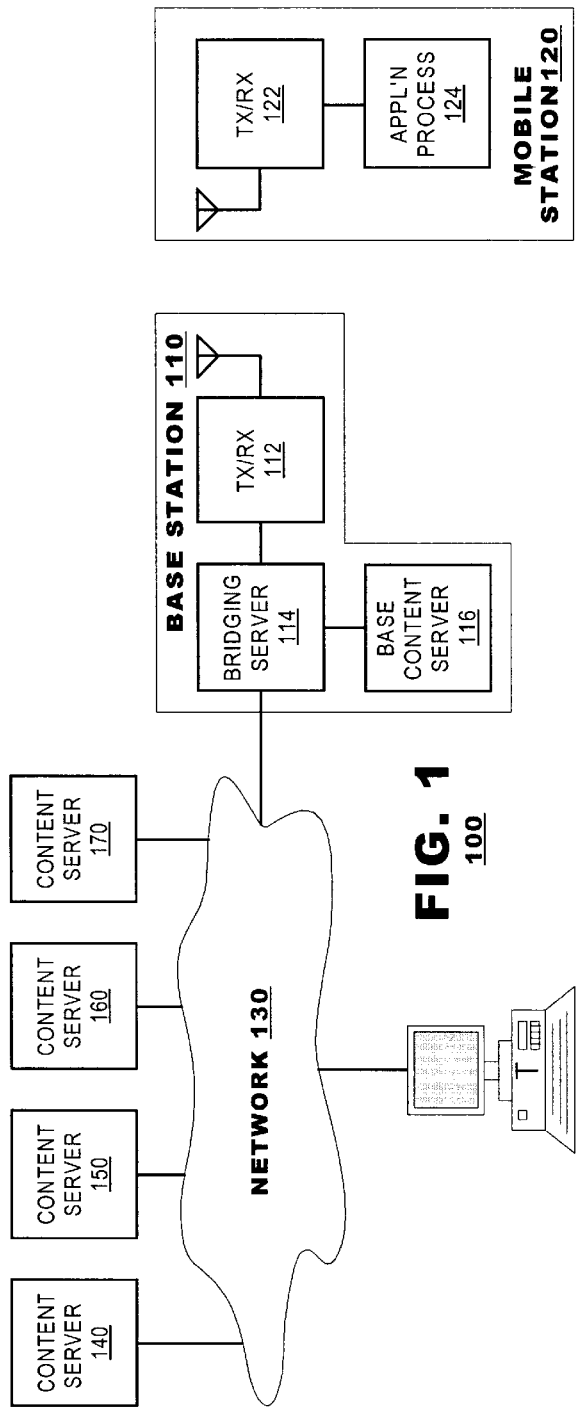
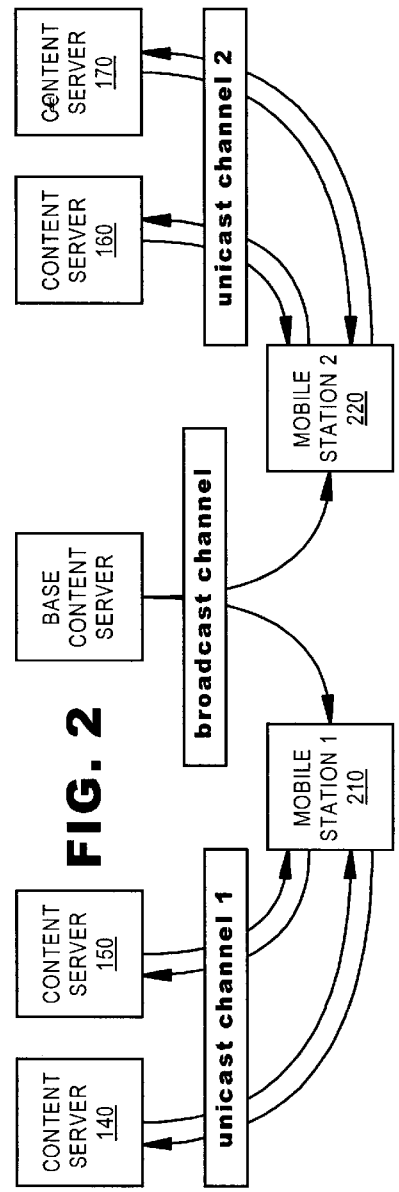
FIG. 1
100
FIG. 2

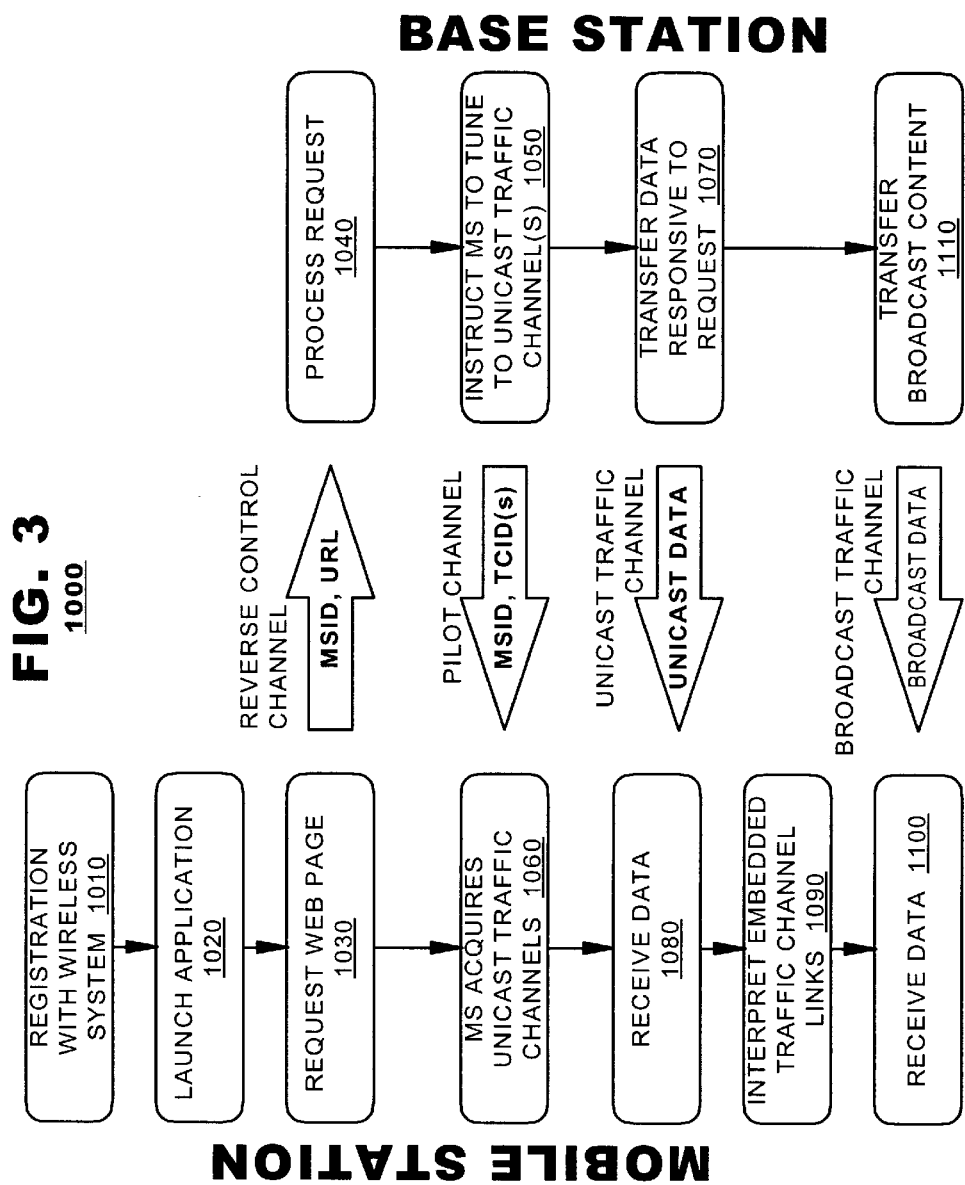

HYPERMEDIA LINKS THAT ADDRESS TRAFFIC CHANNELS IN A WIRELESS COMMUNICATION SYSTEM

BACKGROUND

The present invention relates to a bandwidth-efficient communication protocol for wireless information browsers having access to broadcast and unicast content.

Wireless communication systems are well-known. Such systems typically include stationary base stations that are provided in communication with a larger communication network, such as the public switched telephone network (PSTN) or an Internet, and with one or more mobile stations. The base stations and mobile stations exchange data via radio communication links. A variety of access techniques are known for wireless communication systems, including frequency division multiple access (FDMA), time division. multiple access (TDMA) and code division multiple access (CDMA), among others. For the purposes of this discussion, the differences among the access techniques are immaterial; it is necessary only to understand that each access technique defines "traffic channels" through which base stations and mobile stations may exchange data in a manner that simulates unicast, point-to-point transmission.

"Unicast transmission" refers to a private transmission that occurs between a strictly defined set of members in a communication system. Ordinary domestic telephone service is an example of unicast transmission. In an ordinary telephone call, a telephone network establishes a temporary point-to-point communication link between two terminals in the network. When a caller speaks during the progress of this call, the caller's speech is delivered only to the other call participant and no other.

Unicast transmission may be contrasted with "broadcast transmission," a mode of communication where information is intended to be received by an unregulated number of members in a communication system. Traditional FM and AM public radio stations serve as an example of broadcast transmission.

A traditional wireless communication system typically provides "simulated unicast service." Each traffic channel typically is broadcast within a cell, a predetermined geographic region of coverage, and can be received by any other member of the system. However, certain control mechanisms exist to prevent unintentional reception of traffic channels. For example, most mobile stations are programmed to monitor a predetermined traffic channel, called a "pilot" channel, to establish wireless calls. Unless commanded to tune to another traffic channel, the mobile stations typically will neither transmit nor receive data in the other traffic channels. Thus, unicast service is achieved for the other traffic channels.

It is foreseeable that there will be significant consumer demand for wireless communication systems that support high rate data operations such as Internet browsing. Internet browsing, however, raises significant challenges to wireless service providers. For example, radio spectrum is a scarce commodity in wireless systems. The high data rates that are required for the transfer of video and/or audio data are thought to be prohibitive in a wireless application.

A straightforward application of Internet browsing in wireless communication systems would transmit data, such as web pages and the like, to each mobile station in individual unicast traffic channels. However, such a scheme is readily recognized as inefficient. While technologies exist to transfer data to a small set of mobile stations, they have problems with scale. A cell site likely will not posses sufficient bandwidth to transfer data to a large number of mobile stations simultaneously. The volume of data to be broadcast to a large number of subscribers simply overwhelms the resources of the wireless system.

Accordingly, there is a need in the art for a wireless data protocol that permits high rate data transfers in wireless systems. Further, there is a need in the art for such a protocol that reduces the total quantity of data that is transmitted in the wireless system.

SUMMARY

Embodiments of the present invention provide a hypertext protocol for Internet browsing applications in which hyperlinks can address traffic channels in a wireless system. Broadcast information content may be transmitted by the wireless system in one or more broadcast traffic channels. Multiple mobile stations may receive the broadcast information content simultaneously. Because the mobile stations share the broadcast traffic channels, a high throughput is achieved with proportionately less bandwidth being broadcast into a cell site.

BRIEF DESCRIPTION OF THE DRAWINGS

FIG. 1 illustrates a block diagram of a wireless system according to an embodiment of the present invention.

FIG. 2 is a signal flow diagram of a wireless system according to an embodiment of the present invention.

FIG. 3 is a flow diagram illustrating a method according to an embodiment of the present invention.

DETAILED DESCRIPTION

Embodiments of the present invention provide a hypertext protocol for Internet browsing applications that contributes to bandwidth conservation in a wireless transmission system. According to the present invention, links may identify traffic channels transmitted by a wireless system. These "traffic channel hyperlinks" permit a mobile station to access data by tuning its receiver to a broadcast traffic channel identified by the link. It is envisioned that information content that is appropriate for a large subscriber base will be broadcast in these traffic channels and, therefore, the "broadcast traffic channels" may be shared by multiple subscribers. These traffic channel links also may be used to supplement other types of hyperlinks that currently are available in the various hypertext protocols.

The protocol of the present invention capitalizes on certain common interests of the subscribers to a wireless system. For example, an access provider may be able to determine that its subscriber base may have strong interests for regional weather information, regional traffic information, generic business information (such as performance of major stock indices) or other generic information. The subscriber base may review this information without filtering the information to a large degree. Such information, called "broadcast content," is appropriate for inclusion in broadcast traffic channels.

By contrast, subscribers may erect substantial filters for other kinds of information. While the subscriber base may be interested in stock prices generally, for example, each subscriber may be interested primarily in the stocks that subscriber owns. Stock price information may not be appropriate for inclusion in a broadcast traffic channel because of the highly selective filtering that subscribers typically apply to it.

Thus, "broadcast content" refers to a set of information that may be delivered to a large portion of a subscriber base as an integral unit. By way of example, broadcast content may include banner advertisements, regional weather reports, regional traffic reports and headline news digests.

FIG. 1 illustrates a wireless communication system 100 adapted for wireless browsing applications. The system may include a base station 110, one or more mobile stations 120 and a computer network 130. A base station may include a transceiver 112 and a bridging server 114. Optionally, the base station may include a base content server 116. The mobile station 120 may include its own transceiver 122 and an application process unit 124.

The base station 110 may be provided in communication with a computer network 130 such as an Internet. The computer network 130 provides communication paths between the bridging server 114 and other components 140–170 of the network 130. By convention, each of the components 140–170 is assigned one or more network addresses. The network 130 operates according to a predetermined communication protocol by which a unit of data (such as a packet) may be provided to the network 130 with a network address. The network 130 may include routers and other communication equipment (not shown) that routes the data by its network address and ultimately delivers the data to its intended destination. In this regard, the operation of the network 130 is well-known.

Network access may be extended to wireless terminals such as the mobile station 120 through a base station. The transceivers 112 and 122 of the base station 110 and mobile station 120 establish a communication link over a traffic channel according to one of the known communication formats. Having established the communication link, the application process 124 and bridging server 114 are provided in communication with one another. The bridging server 114 may perform protocol translations as it relays data from the mobile station 120 to the network 130 and vice versa.

Conventionally, the network 130 permits network users to access and display information content—an operation referred to as "browsing." To facilitate browsing, the network 130 may be provided in communication with one or more content servers 140–170. The content servers 140–170 each may store the information in computer readable form and, in response to a request from another terminal in the network (such as terminal T), deliver the information to the terminal. The terminal, when it receives the data, interprets the received data and renders it for display. The information content may be audio, visual and/or other multi-media data. The information content may be organized into predetermined units, often called "documents."

A variety of communications protocols are known to support browsing, including the known Hyper-Text Transfer Protocol ("HTTP"). The HTTP protocol permits a single aggregate document that is rendered at a terminal T (or mobile station 140) to be assembled from multiple documents stored at diverse content servers 140–170. For example, it is common for banner advertising for many documents to be supplied from a dedicated advertising server. Thus, a base document from a first content server 140 may be supplemented with data from other content servers 150–170. The base document may include embedded links that refer to the other content servers 150–170. When received and interpreted at a terminal T (or the application process 124), the embedded links cause the terminal T (application process 124) to send other requests to the other content servers 150–170 for additional information content. When the terminal T has received the base document and other supplementary content, it may render and display an entire document.

An embodiment of the present invention introduces a new address scheme to the set of links that are include in a hyper-protocol such as the HTTP protocol. In this embodiment, a link may identify a wireless traffic channel. When interpreted by a mobile station, the traffic channel link causes the mobile station to tune its transceiver to the traffic channel identified by the link and receive data from the traffic channel.

It is expected that this embodiment can alleviate congestion in a wireless data transfer system. With resort to these traffic channel links, a publisher of information content may cause several mobile stations to share single traffic channel simultaneously. Whereas conventional wireless browsing may have caused broadcast content to be transmitted to several mobile stations in several unicast traffic channels, this embodiment of the present invention permits the broadcast content to be provided in a single traffic channel. The several mobile stations each could tune it transceiver to the single traffic channel and receive the broadcast content.

Returning to FIG. 1, the base station 110 optionally may include an base content server 116. The base content server 116 may store broadcast content for transmission over the broadcast traffic channels. Of course, there is no requirement for the content server to be co-located with the base station 110. In an alternative embodiment, broadcast content for the base station may be stored in another content server, such as server 140. The broadcast content may be carried from the content server 140 to the base station 110 by the network 130 before the information is transmitted in a broadcast traffic channel.

FIG. 2 is a signal flow diagram providing an example of the bandwidth conservation achieved by the present invention. FIG. 2 illustrates an exemplary cell site 200 populated by two mobile stations 210, 220. The mobile stations may communicate with the content servers 140–170 via traffic channels and the network 130 of FIG. 1 (network not shown in FIG. 2). In the example of FIG. 2, a base content server 230 is provided to function as an advertising server. The base content server 230 may periodically retrieve and transmit banner advertisements for documents using the broadcast traffic channel.

Consider the first mobile station 210. The mobile station 210 transmits a request for data in a unicast channel addressed to a first content server 140. The first content server 140 may deliver a base document to the first mobile station via the unicast traffic channel. The base document may include embedded links identifying the broadcast traffic channel and to other content servers 150 on network 130. The mobile station 210 would transmit a second message addressed to the second content server 150 and receive data in response thereto. It also would tune to the broadcast traffic channel and receive banner advertising data from the base content server 116. Based upon the data from the first and second content servers 140, 150 and from the base content sever 116, the mobile station 210 would display a complete document.

Consider also the second mobile station 220. The mobile station 220 transmits a request for data in a second unicast channel addressed to a third content server 160. The third content server 160 may deliver a base document to the second mobile station 220 via the second unicast traffic channel. The base document may include embedded links identifying the broadcast traffic channel and another content server 170 on network 130. The mobile station 220 would transmit a second message addressed to the fourth content server 170 and receive data in response thereto. It also would tune to the broadcast traffic channel and receive banner advertising data from the base content server 116. Based upon the data from the third and fourth content servers 160, 170 and from the base content sever 116, the mobile station 220 would compile a complete document that may be delivered to a user.

As is apparent from FIG. 2, the two mobile stations 210, 220 each may access data from the base content server 116 using a common traffic channel. The model illustrated in FIG. 2 is scalable; it permits additional mobile stations to communicate with content servers from the network 130 over dedicated unicast channels and to simultaneously share the common broadcast channel to receive broadcast content from the base content server.

Using the principles of the present invention, wireless access providers may coordinate with information publishers to optimize the performance of the wireless system to their subscribers' needs. The present invention permits expansion of the broadcast channel concept to multiple broadcast channels, each carrying its own information. For example, a first broadcast channel may carry news headlines, a second broadcast channel may carry regional weather information, a third broadcast channel may carry regional traffic information. It is expected that an access provider may attempt to determine what kinds of information a large segment of its subscribers are monitoring from wireless terminals and to allocate its broadcast traffic channels in a way that places broadcast content in the broadcast traffic channels.

Alternatively, diverse types of information may be provided within a single broadcast traffic channel. A traffic channel hyperlink may include a filter identifier that may be used by the mobile station to render only a portion of received data from the broadcast traffic channel for display.

According to an embodiment of the present invention, the transceiver 122 of a mobile station 120 (FIG. 1) may be a multi-channel transceiver. That is, the transceiver 122 includes sufficient hardware to permit the transceiver to receive and decode multiple traffic channels simultaneously. Accordingly, a mobile station 120 should be able to receive data in multiple unicast and broadcast traffic channels simultaneously. Such an embodiment permits the mobile station to receive data over multiple parallel traffic channels which increases the aggregate communication data rate to the mobile station.

FIG. 3 illustrates a method of operation 1000 according to an embodiment of the present invention. The method illustrates the flow of signaling that may be exchanged between a base station and mobile station in the wireless system of FIG. 1. The method may begin with registration by the mobile station with the wireless system (Step 1010). The mobile station may also launch a browsing application (Step 1020). Such steps are conventional in a wireless system.

At some point, a user may request a document (Step 1030). To acquire the document, the mobile station may transmit a request for the document to the base station. It may do so, in an embodiment, by transmitting a message to a base station on a reverse control channel, the message including a mobile station identifier (MSID) and an identifier of the requested document (illustrated as a URL in FIG. 3). In response to the message, the base station forwards the request to the network 130 (Step 1040). The request may cause the content servers 140–170 and the network 130 to transfer data to the base station in response thereto.

The base station 110 may transmit a command message to the mobile station instructing the mobile station to receive data on one or more unicast traffic channels (Step 1050). The command message may identify the mobile station by its MSID and include identifiers of the traffic channels on which the mobile station will receive data in response to its request. The mobile station configures its transceivers to receive data on the traffic channel(s) so identified (Step 1060). Thereafter, the base station transmits and the mobile station receives the responsive data via the unicast traffic channels (Steps 1070, 1080).

The responsive data may include embedded links to broadcast traffic channels of the base station. If so, the mobile station interprets the embedded traffic channels links and causes its transceiver also to receive data over the broadcast traffic channels identified by the traffic channel links. (Step 1090, 1100). Throughout the process, the base station broadcasts the broadcast content over the broadcast traffic channels (Step 1110).

Embodiments of the present invention may extend to the Standard Generalized Markup Language (SGML), to its subsets, e.g., the Hypertext Markup Language (HTML), and to other methods used to describe a Uniform Resource Locator. HTML is a standard language for publishing hypertext documents on the World Wide Web (WWW). Notably, the HTML language describes a syntax for hypertext links (hence the name "hyperlink"). A hyperlink is text, a graphic symbol or image that appears in a first document and typically references second document. Documents can be of various forms (e.g., text, graphics, audio, movies, etc.). A hypertext reference contains a Uniform Reference Identifier ("URI" or "URL") that identifies or "points to" the location of the second document on the WWW. Optionally, the hypertext reference may point to segment of a current document being displayed.

An in-line image is one type of hyperlink that allows an image to be inserted when a document is displayed. The in-line image element of the HTML grammar specifies a SRC (source) argument such as: "<SRC="image_url">". The SRC argument includes a URL pointing to the document containing the image to be displayed. The naming convention for the image URL may be the same as for hypertext links, for example: "<a href="./my_images/"> <Img src="family_photo.gif"> </a>". This command would instruct a web browser to locate a file "family_photo" on the same server containing the referring document, in the subdirectory "my_images".

A URL typically includes three basic components: a scheme, a machine domain, and a file location (a directory path and file name), for example: "http://www.mystuff.com/wwwdoc/file.html". In this example, the URL identifies a document "file.html" located in the subdirectory "wwwdoc" in the machine domain www.mystuff.com, which would be a registered internet address of the referenced machine. The URL also refers to a protocol (such as "http") for communicating between machines (e.g., a mobile station 120 and a network server 150 (FIG. 1)). In the exemplary URL shown above, the protocol is "http" but other protocols exist, such as FTP and telnet, that are appropriate for use with the present invention. Http, ftp and telnet are well-defined protocols, customary in the art.

The are various ways to extend the URL syntax to include the traffic channel links described above. One method is to define an new argument to the in-line image syntax. For example, consider the following: "<rtp://<channel:subchannel>", where "rtp" identifies a radio transport protocol suitable for communication with mobile station 120 and <channel:subchannel> identifies a subchannel for receiving the transmission. The link may be set forth as "<Img src="<rtp://<channel:subchannel>", <filter>", where filter identifies a type of broadcast, rather than a specific document. These elements can be used to construct the following in-line reference:

<IMG SRC="<rtp://<channel:subchannel>", "filter", refresh=n, ALIGN="bottom", HEIGHT="n", WIDTH="""m">"

Such a reference may be interpreted by a browser to construct an in-line image at the bottom of a display having a height of n pixels and a width of m pixels.

Alternatively, the hyperlink instruction,

<a HREF=rtp://<channel:subchannel> <img src="http://../logo.gif" width=140 height=60 border=0></a> defines an inline image retrieved through standard unicast methods, but if pointed to and clicked, retrieves a broadcasted (or multicasted) image. Such images can contain graphic, audio, mpeg 2, text, etx data.

The URL, e..g., HREF=rtp://<channel:subchannel, that points to a traffic channel may have the following semantics: a traffic channel from the base station could be specified directly, in a manner similar to numeric IP addresses, or, alternatively, traffic channels could be referenced by symbolic name. Where the traffic channel is directly addressed, a mobile station 120 may tune a receiver to the specified traffic channel frequency range and would decode packets therein.

Where traffic channels are identified symbolically, the symbolic name would be transmitted from the mobile station 120 to the base station 110 and the base station 110 would cause the symbolic name to be translated to a traffic channel identifier. The base station 110 would return the traffic channel identifier to the mobile station 120 and the mobile station 120 would tune to the identified traffic channel and receive data.

In yet another embodiment, a base station 110 may transmit information containing symbolic name to traffic channel translations. The base station 110 could transmit these translations over a pilot channel or other administrative traffic channel used to coordinate elements within the wireless communication network. In this embodiment, the mobile station 120 may store the translation information in a local memory and perform a symbolic-name-to-traffic-channel-identifier translation itself when processing a traffic channel link.

A further embodiment may provide the symbolic-name-to-traffic-channel-identifier translation pre-stored in a memory at the mobile station, such as a ROM.

A traffic channel link also may specify a filter. A filter may permit a mobile station 120 to disregard certain types of data present in a traffic channel. For example, a traffic channel may include data relating to weather, traffic and advertisements. The filter might specify that only traffic information and advertisements from one of several companies should be rendered for display at the mobile station 120. The filter would also specify what to display if the information is not found in the decoded packets.

A traffic channel link may include a refresh parameter that determines how often the mobile station should refresh the display.

Several embodiments of the present invention are specifically illustrated anrd described herein. However, it will be appreciated that modifications and variations of the present invention are covered by the above teachings and within the purview of the appended claims without departing from the spirit and intended scope of the invention.

We claim:

1. In a wireless communication system, a browsing method for a mobile station, comprising:

receiving in a first unicast traffic channel a hyperlink, wherein the hyperlink identifies and symbolically addresses a broadcast traffic channel, periodically receiving, over an administrative traffic channel, translation information associating symbolic addresses of broadcast traffic channels with identifiers of the broadcast traffic channels, storing the translation information in a memory at the mobile station, resolving the symbolic address of the hyperlink by retrieving a traffic channel identifier from the mobile station memory stored in association with the symbolic address, tuning a receiver of the mobile station to the broadcast traffic channel, wherein the tuning step is performed with reference to the retrieved traffic channel identifier, and receiving data via the broadcast traffic channel.

2. The browsing method of claim 1, further comprising: rendering the hyperlink for display, and wherein the tuning and receiving steps are performed only after the rendered hyperlink is selected.

3. The browsing method of claim 1, wherein the hyperlink directly addresses the broadcast traffic channel.

4. The browsing method of claim 1, further comprising a symbol-to-traffic-channel translation comprising:

transmitting a resolution request to a base station, and receiving a traffic channel identifier in response thereto, wherein the tuning step is performed with reference to the received traffic channel identifier.

5. The browsing method of claim 1, wherein the symbol-to-traffic-channel translation is stored in a memory at the mobile station.

6. The browsing method of claim 1, wherein banner advertising data is transmitted over the broadcast traffic channel.

7. The browsing method of claim 1, wherein the hyperlink contains a filter identifier and the browsing method further comprises rendering only a portion of the data received via the broadcast traffic channel based upon the filter.

8. A wireless browsing method, comprising:

transmitting a request for data, receiving in a first wireless traffic channel, first data responsive to the request, the first data including a hyperlink identifying a second wireless traffic channel, wherein the hyperlink symbolically addresses the second wireless traffic channel;

periodically receiving over an administrative traffic channel, translation information associating symbolic addresses of traffic channels with traffic channel identifiers of the traffic channels, storing the translation information in a memory at the mobile station, resolving the symbolic address of the hyperlink by retrieving a traffic channel identifier from the mobile station memory stored in association with the symbolic address, and receiving data in a second wireless traffic channel, wherein the second receiving step is performed with reference to the retrieved traffic channel identifier.

9. The browsing method of claim 8, further comprising:
rendering the hyperlink, and wherein the second receiving step is performed only after the rendered hyperlink is selected.

10. The browsing method of claim 8, wherein the hyperlink directly addresses the second wireless traffic channel.

11. The browsing method of claim 8, further comprising a symbol-to-traffic channel translation comprising:

transmitting a name resolution request to a base station, and receiving a traffic channel identifier in response thereto, wherein the tuning step is performed with reference to the traffic channel identifier.

12. The browsing method of claim 8, wherein banner advertising data is transmitted over the second traffic channel.

13. The browsing method of claim 8, wherein the hyperlink contains a filter identifier, the browsing method further comprising rendering a portion of the data received via the second traffic channel based upon the filter.

* * * * *